Patented Oct. 10, 1939

2,176,038

UNITED STATES PATENT OFFICE 2,176,038

STABILIZATION OF GLUE, CASEIN, AND OTHER PROTEIN MATERIALS

Sidney Musher, New York, N. Y., assignor to Musher Foundation Incorporated, New York, N. Y., a corporation of New York No Drawing. Application October 10, 1938, Serial No. 234,247

14 Claims. (Cl. 134—12)

This invention relates to methods for retarding protein decomposition or putrefaction of substantially pure protein materials, such as casein, gelatin, glue, etc.

There are many problems associated with high protein containing materials and particularly those of animal origin as a result of the decomposition that normally occurs. Casein used in the manufacture of paper frequently has an objectionable odor resulting from its decomposition prior to use; gummed paper made with glue of fish origin develops characteristic objectionable odors and taste resulting from the glue decomposition. These are only a few of the instances whereby protein decomposition is a serious factor in the paper, textile, food and other industries.

An object of this invention is, therefore, the retardation of protein decomposition in such high protein or substantially pure protein materials as casein, gelatin, albumen, etc.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

It has been found that oat and other cereal flours retard rancidity. This is a phenomenon relating to oxidation of glycerides or glyceride containing products or those products which are normally subject to fat rancidity. Protein decomposition presents an entirely different problem and is altogether unrelated to rancidity and the present invention is particularly of importance in its application to protein materials that are substantially fat free.

Certain materials have been suggested heretofore for utilization to retard protein decomposition and include inorganic substances, such as salt and also organic substances such as sodium benzoate. These protein stabilization agents appear to be selective in their protein stabilization action, and they cannot be used advantageously in the retardation of rancidity. Because of this selective action it is not to be expected that antioxidant materials which retard rancidity or similar oxidative processes would have ony effect upon retarding protein decomposition or putrefaction which represents an altogether different type of phenomenon associated with the internal structure of the protein molecule.

As a matter of fact, it has been found that salt, although effective in retarding protein decomposition, is actually an accelerator in fat decomposition. Even where the salt is substantially free of metallic impurities, it nevertheless possesses definite pro-oxygenic or rancidity enhancing properties with regard to fats and oils and compositions containing them.

Other examples might be given to indicate lack of association between products which retard rancidity and those which retard protein decomposition.

It has now been surprisingly found that the cereal flours, and particularly when dry milled and finely divided, and desirably in raw or unbleached condition, have the property of retarding protein decomposition particularly of the high protein containing animal products and are substantially effective on those products that are free or practically so. These cereals are substantially lacking in lecithin content, having generally less than 0.75% total phospholipins.

Among the cereal flours that may be utilized are included those derived from oats, barley, corn, hominy, tapioca, rye, rice, buckwheat etc.

These flours may conveniently be used for stabilization of proteins used in paper making, sizing or coating and also in the textile and food industries.

For example, in the manufacture of paper and particularly coated paper, the use of protein adresives such as glue, gelatin, casein, etc. is very common. Glue, for example, is obtained by extracting various animal tissues with water, concentrating the solution and forming into sheets. The glues are made from hides, bones, or other animal products or blends of them. These include fish flue, pigskin glue, etc. Gelatin is obtained from similar sources but is of a more carefully selected origin.

These glues and gelatins are substantially fat free by reason of the fact that they are obtained as water extracts of the animal substances. Not only are they subject to protein decomposition during the time of manufacture, but also while in dried, flaked or ground form prior to use as adhesives, or for other purposes.

Frequently a paper mill will use formaldehyde to retard protein decomposition of the solution ready for use, but this has the disadvangtage of changing or coagulating the p.otein structure and also of rendering the finished paper or other material undesirable for use in the wrapping of food products or as an adhesive for envelopes, etc.

This protein decomposition generally results in the development of objectionable putrid flavors or odors and the decomposition develops rapidly upon the storage or holding of the protein material.

Example I

The liquid protein glue obtained from ox-hide was treated prior to drying with 1% of oat flour against the solids weight. The glue containing the oat flour was then dried in sheets to form gelatin. This gelatin was compared with gelatin made from the same stock without the oat flour. After allowing both gelatins to stand at room temperature for 45 days, the oat flour treated gelatin was not substantially changed in odor from the time it was first produced, whereas the untreated gelatin had developed a characteristic strong, objectionable, hide-like putrid odor.

Example II

Bne glue (made using a dilute solution of hydrochloric acid and then boiled) was prepared with 5% of dry milled maize flour against the solids weight of the glue. The glue was then dried in thin sheets under vacuum and compared with gelatin made from the same stock free of maize flour. After holding for 45 days at room temperature the glue prepared with maize flour was comparatively unchanged, whereas that which was free of maize flour possessed an odor characteristic of bones which had undergone a degree of putrefaction.

The amount of oat flour or other cereal product used may be widely varied. From 0.1%, for example, of oat flour may be used in a liquid glue against the solids weight up to 15% of the weight of the wet glue in diluted form.

Not only does the utilization of the cereals retard the protein decomposition of these substantially fat free protein materials, but when they are used in further processing such as sizing on paper, in the hat industry, for finishing special kinds of woven material including silk, in the color industry, etc., a marked lessening of objectionable odors which normally result from the glue or gelatin decomposition of the finished product is observed.

Example III

Fat-free fish glue prepared from cod waste was treated with 2.5% of oat flour against the solids weight of the glue. Glue made from the same stock, but free of oat flour was compared with the oat treated glue after drying, allowed to remain for 60 days at room temperature and then used as an adhesive on paper. After application to the paper, a markedly less characteristic fishy odor was observed in the oat treated glue applied to paper, as against that which was free of oat flour. The differences became more pronounced after the papers were held for 30 days and were particularly pronounced after they were used for their adhesive properties.

Edible gelatin as produced from calves' heads, legs, or the cartilage and skins of animals is used for many edible purposes such as in the manufacture of jellies, puddings, ice cream, etc. Not only is the gelatin subject to protein decomposition, but frequently the products with which it is employed are similarly affected. Moreover, for this class of materials it is important for the gelatin to retain its odorless and tasteless characteristics both prior to use in the finished product and following such use.

Where the starchy solids of the cereals would be objectionable, the starch free, fibre free, carbohydrate containing water soluble extracts of such finely divided, unbleached cereals may be employed. Of particular importance are the water soluble and the alcohol soluble extracts such as those made using an OH type of solvent of a low molecular weight aliphatic group. The water extract of oat flour may, for example, be prepared using 1 lb. of the finely divided cereal to 1 gallon or more of water, mixing thoroughly, and then removing the undissolved portion by gravity filtration and decanting or siphoning, centrifuging, ordinary filtration, etc. The extracted portion may then be utilized for admixture with the protein material prior to drying or may be concentrated to a substantially solid or plastic mass and then used for its protein decomposition inhibiting properties.

Example IV

A gelatin prepared from calves' legs, was treated with 0.1% against the solids weight of the concentrated water extract of pulverized oats made by dissolving 10% of pulverized oats in water, mixing thoroughly and filtering off the undissolved portions, then evaporating the water containing the extract to a consistency of a heavy molasses. This gelatin was compared with gelatin made of the same stock free of the extract. Immediately after manufacture a less pronounced animal odor and flavor were observed in the gelatin containing the extract. The gelatins were then used in the manufacture of vanilla ice cream, which ice cream was held for 90 days at 10° F. After that time the ice cream was scored and it was found that the ice cream prepared with the treated gelatin had a definitely and markedly higher flavor score than the ice cream prepared with the untreated gelatin.

The water extract of pulverized oats may be used, for example, in amounts ranging from 0.01% to 2% against the solids weight of the glue. Or the supernatant water portion of an oat flour water mixture may be used after the oat flour solids have been allowed to settle out for addition to the liquid glue, or the liquid glue may be used as the extractant.

A particularly desirable feature of this invention is that there is no apparent change in the protein structure or no protein coagulation by the use of the cereals as would be obtained where formaldehyde is used or even as is observed when using salt as a protein decomposition retardant.

Among the other protein materials treated in accordance with this invention are those produced from dairy products such as casein. Casein is widely used, for example, as a sizing on paper for its adhesive and coating properties. Papers thus made develop objectionable characteristics due to the casein decomposition.

Oat flour may be added to the skim milk before manufacturing the casein, but preferably it should be added to the casein immediately before drying in order to exert its most beneficial effect.

Example V

Casein was made with 2.0% of finely milled oat flour added to it immediately before drying and the mixture dried together. This was compared with casein made from the same milk stock without the oat flour. The caseins thus obtained were applied as a coating on a magazine paper and the paper printed in part and set aside for 90 days at room temperature. At the close of that time, it was observed that the paper made with the oat treated casein showed a materially lesser old ink and old casein odor and was also less faded in color than the paper made with the untreated casein.

Similar results are obtained when casein or similar materials are used in the textile industry.

Another class of pure protein material is egg albumen made from egg white.

Example VI 1.0% maize flour was added to liquid egg white before the drying and the egg white maize combination was then dried. This was compared with egg white made from the same stock free of maize flour. The egg albumen thus obtained was completely fat free. These samples were set aside in diffused daylight at room temperature and subjected to organoleptic observations at monthly intervals with the following results based upon a perfect score of 25.

| | Score after— | | |
|---|---|---|---|
| | 1 month | 2 months | 3 months |
| Treated albumen | 24 | 22 | 17 |
| Untreated albumen | 20 | 12 | 8 |

Although the cereal may be added at any stage in the manufacturing process or after completion of the process it is most effective when used before final drying, such as when gelatin is in wet glue form and before having been rendered dried.

Salt may also be employed along with the cereal as a carrier in the curing of the animal bones, hides, or similar products, and prior to the extraction of the protein materials therefrom. From 1% to 25% of the cereal against the weight of the salt may be employed for this purpose, the salt cereal combination being removed following the curing process. Less desirably, other carriers, such as sugar may be employed. The cereal may also be used in the original cooking operation without any carrier.

Other high protein containing materials that may be treated in accordance with the instant invention are such products as fish meal and tissues, lean meat, skim milk, buttermilk, cottage cheese and other protein products. The cereals may also be employed with caseins that are used in the manufacture of paints, for example.

Example VII

Cottage cheese was treated with 0.05% of the concentrated skim milk extract of pulverized oats made by adding 15% of the pulverized oats to liquid skim milk, allowing to stand for 3 hours, recanting off the supernatant liquid, and drying the extract. This was compared with similar cottage cheese to which no extract was added after holding at 40° F. for 5 days. At that time a noticeable and objectionable protein decomposition had developed in the untreated cottage cheese whereas the treated cheese was substantially unchanged.

Although animal proteins are more particularly referred to, this invention may be applied to the extracted vegetable proteins such as those obtained from soya beans, etc.

The cereals thus employed do not detract from the adhesive properties of the proteins and frequently add to their adhesiveness by reason of the cereal starch content although the starch does not appear to be responsible for the protein decomposition inhibiting properties of those cereals.

Among the extracts of the cereals that may be employed, the water extract is probably the most desirable because it can be so cheaply obtained. The residue left after water extraction may be used for normal feed purposes, in the manufacture of starch, etc. Alcohol, preferably of low molecular weight, such as ethyl alcohol may also be employed as may also glycerol, sugar syrups, etc.

It is particularly important to note that the cereals are not deactivated when subjected to high temperatures as during drying, or other processing with the protein materials. To the contrary, particularly their water and alcohol soluble extracts are increased in potency when subjected to elevated temperatures such as in excess of 250° F. and preferably at 350° F. or above and particularly in the presence of the material subject to putrefaction.

In addition to the cereals, there may less preferably be employed the oil-bearing seeds and nuts, most desirably in de-oiled form, preferably having an oil content of 10% or less. Since the presence of any fats or oils in contact with any of these protein materials is generally objectionable, the de-oiled seeds or nuts are by far preferable to those with a high fat content. Among those which can be utilized for this purpose are soya, peanut, cottonseed, sesame, linseed, walnut, cacao, dried olives, green coffee, etc.

There may also be employed the water or alcohol soluble extracts of these oil seeds, preferably free of oil content so as not to contaminate the protein material. Even the milky water extract of an oil seed would be objectionable in frequent cases because of its fat content and conseqent fat contamination of the protein that would ensue. Such extracts of oil seeds should preferably be subjected to centifuging to remove substantially all the oil causing the milky suspension.

Example VIII

1% of peanut press cake (containing not over 10% of oil) was admixed with powdered egg albumen and compared with untreated albumen. Scoring was carried out as referred to in Example VI.

| | Score observed after— | | |
|---|---|---|---|
| | 1 month | 2 months | 3 months |
| Treated albumen | 22 | 20 | 12 |
| Untreated albumen | 19 | 13 | 7 |

The protein decomposition inhibiting effect of the cereals is observed also when used with fatty bodies such as with mixtures of gelatin and sulphonated oils to be used in textile processing, in products containing both fat and protein such as fatty fish and meat, blood, etc., wherein, for example, discoloration due to blood pigment change is retarded in addition to retarding protein decomposition.

The present application is a continuation in part of application, Serial No. 34,293, filed August 1, 1935.

Having now described my invention, what I claim is:

1. A stabilized material selected from the group consisting of substantially fat-free glue, casein and alubumen normally subject to protein decomposition treated with a small percentage of a dispersed stabilizing material selected from the group consisting of the finely divided unbleached cereals, nuts and seeds and the starch free, oil free, fibre free, carbohydrate containing water and alcohol soluble antioxygens extracted therefrom.

2. A stabilized substantially fat-free high animal protein material containing a small amount of a cereal stabilizing material, said stabilizing material being selected from the group consisting of the unbleached, finely divided cereal flours and the starch free, oil free, fibre free and carbohydrate containing, water and alcohol soluble antioxygens extracted therefrom.

3. A stabilized substantially fat-free high protein containing material substantially stabilized against protein decomposition made by treating the original substance from which the protein material was extracted with a small percentage of a finely divided stabilizing material selected from the group consisting of finely divided, unbleached cereals, nuts and seeds and the starch free, oil free, fibre free, carbohydrate containing water and alcohol soluble antioxygens extracted therefrom.

4. A water soluble substantially fat-free gegatinous protein material stabilized against protein decomposition containing not over 2% of a water soluble, starch free, oil free, fibre free, carbohydrate containing extract of a finely divided cereal dispersed throughout the body of the stabilized protein material.

5. A water soluble substantially fat-free gelatinous protein material substantially stabilized against protein decomposition containing not over 15% of a finely divided raw and unbleached cereal flour dispersed throughout the body of the stabilized protein material.

6. In compositions for sizing, finishing and coating paper and textiles, a stabilized water soluble substantially fat-free protein material containing a small percentage of a substantially oil-free stabilizing material derived from the group consisting of finely divided, unbleached cereals, nuts and seeds and the starch free, oil free, fibre free, carbohydrate containing water and alcohol soluble antioxygens extracted therefrom.

7. A method of stabilizing a substantially water soluble substantially fat-free protein material against protein decomposition, which comprises adding to such material a small amount of a dispersed stabilizer derived from a stabilixing material selected from the group consisting of the finely divided, unbleached cereals, nuts and seeds and the starch free, oil free, fibre free, carbohydrate containing water and alcohol soluble antioxygens extracted therefrom.

8. A stabilized substantially fat-free glue containing a small amount of finely divided cereal stabilizing material, said stabilizing material being selected from the group consisting of the unbleached, finely divided cereal flours and the starch free, oil free, fibre free and carbohydrate containing, water and alcohol soluble antioxygens extracted therefrom.

9. As a sizing for paper, stabilized substanitally fat-free casein containing a small percentage of a cereal stabilizing material, said stabilizing material being selected from the group consisting of the unbleached, finely divided cereal flours and the starch free, oil free, fibre free and carbohydrate containing, water and alcohol soluble antioxygens extracted therefrom.

10. A method of producing stabilized substantially fat-free gelatin which is highly resistant to protein decomposition which comprises mixing the gelatin in liquid aqueous form with from 1% to 5% by weight of unbleached, finely divided oat flour, and then drying the gelatin.

11. A dried sheet stabilized substantially fat-free glue resistant to protein decomposition which contains dispersed throughout the body thereof a small amount of a dry milled, unbleached cereal flour, said cereal flour having been incorporated in the glue before drying and while the glue was in the form of a relatively dilute solution.

12. A process of making a stabilized substantially fat-free casein which is highly resistant to protein decomposition which comprises mixing the casein in aqueous condition with about 1% to 5% of finely milled, unbleached oat flour, drying the casein containing said oat flour thoroughly dispersed therein, whereby there is produced a stabilized casein which may be readily used as a coating and sizing for magazine paper.

13. A substantially fat-free casein stabilized against protein decomposition containing dispersed throughout the body thereof a small amount of a finely milled, unbleached cereal flour.

14. A substantially fat-free high protein containing material stabilized against protein decomposition which contains a small percentage of a combination of a finely divided, unbleached cereal flour and salt.

SIDNEY MUSHER.